United States Patent [19]

Rustemis

[11] 4,400,162
[45] Aug. 23, 1983

[54] PLANETARIUM

[76] Inventor: Constantine F. Rustemis, 380 Sharar Ave., Apt. #4, Opa Locka, Fla. 33054

[21] Appl. No.: 365,596

[22] Filed: Apr. 5, 1982

[51] Int. Cl.³ ............................................. G09B 27/02
[52] U.S. Cl. ...................................... 434/291; 40/431
[58] Field of Search .................. 434/291, 292; 40/431, 40/543; 362/806, 807

[56] References Cited

U.S. PATENT DOCUMENTS

| | | | |
|---|---|---|---|
| 3,089,259 | 5/1963 | Miller | 40/431 |
| 3,387,393 | 6/1968 | Musser | 434/291 |
| 3,634,679 | 1/1972 | Krzyston | 40/431 |
| 3,733,720 | 5/1973 | Byers | 434/291 |

Primary Examiner—Gene Mancene
Assistant Examiner—Wenceslao J. Contreras
Attorney, Agent, or Firm—Jack E. Dominik

[57] ABSTRACT

Disclosed is an enclosed planetarium with both fluorescent and phosphorescent painted representations of astronomical bodies, some of the representations may be mobile and rotated and the remainder of the representations may be painted on the inside surface of the enclosure. An ultraviolet light source is provided which upon activation illuminates all of the representations, but upon extinguishment only the phosphorescent painted representations continue to be visible. This provides two different displays both of which have the pleasing effect of ultraviolet illumination.

9 Claims, 9 Drawing Figures

PLANETARIUM

BACKGROUND OF THE INVENTION

1. Field of Invention

This invention relates to the field of illuminated display devices, and in particular to miniature astronomical display devices which employ ultraviolet illumination with phosphorescent and fluorescent display objects.

2. Description of the Prior Art

The prior art contains various three-dimensional viewing devices, such as the Three-Dimensional Space Viewing Device of U.S. Pat. No. 4,167,074. This patent teaches the illusion of movement in space by providing an ultraviolet illuminated background scene which moves behind foreground scenes which are illuminated with ordinary light.

U.S. Pat. No. 4,016,450 discloses a phosphorescent exit sign which is periodically charged by an ultraviolet light; the sign glows after the intermittent flashing of the ultraviolet light.

U.S. Pat. No. 3,089,259 discloses a box-like display cabinet with ultraviolet illumination and an electrical motor-driven representation of the sun and planets.

U.S. Pat. No. 3,068,010 discloses a game in which answers to questions or other information are prepared in fluorescent paint and thus only visible upon activation of an ultraviolet light source. The game is played by first observing the question under ordinary illumination and then after guessing the answer activating the ultraviolet light source to display the answer.

U.S. Pat. No. 2,015,170 discloses a billboard with two displays and two sources of light, one being ordinary and the other ultraviolet. Thus the scene visible under ordinary light may be changed by extinguishing the ordinary light and activating the ultraviolet light which makes the previously invisible second display become visible.

However, a problem unsolved in the prior art is to provide two astronomical displays both filling the same cabinet and both of which possess the pleasing effect of ultraviolet illumination.

SUMMARY OF THE INVENTION

This invention provides an enclosed planetarium with both fluorescent and phosphorescent painted representations of astronomical bodies, some of the representations may be mobile and rotated and the remainder of the representations may be painted on the inside surface of the enclosure. An ultraviolet light source is provided which upon activation illuminates all of the representations, but upon extinguishment only the phosphorescent painted representations continue to be visible. This provides two different displays both of which have the pleasing effect of ultraviolet illumination.

BRIEF DESCRIPTION OF THE DRAWINGS

The objects and features of the invention may be understood with reference to the following detailed description of preferred embodiments of the invention, taken together with the accompanying drawings, in which.

DESCRIPTION OF PREFERRED EMBODIMENTS

Figure 1:
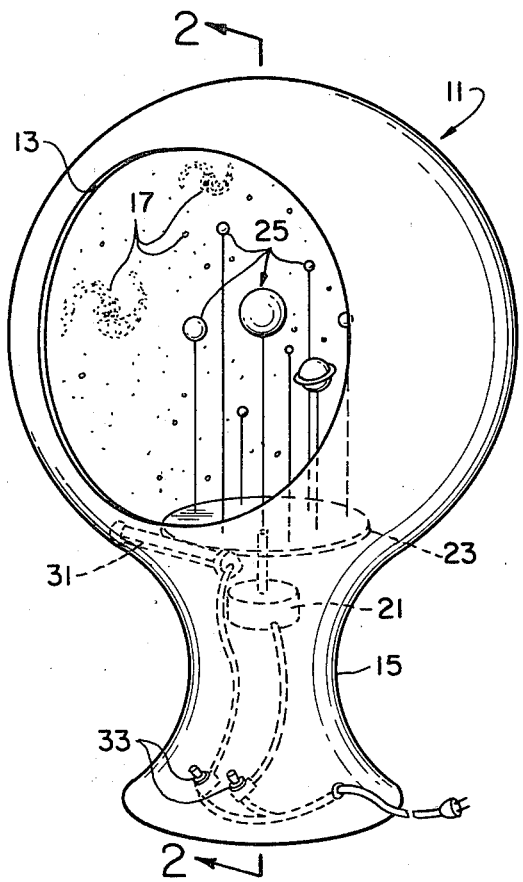
FIG. 1 shows a perspective view of the first preferred embodiment.
Figure 2:
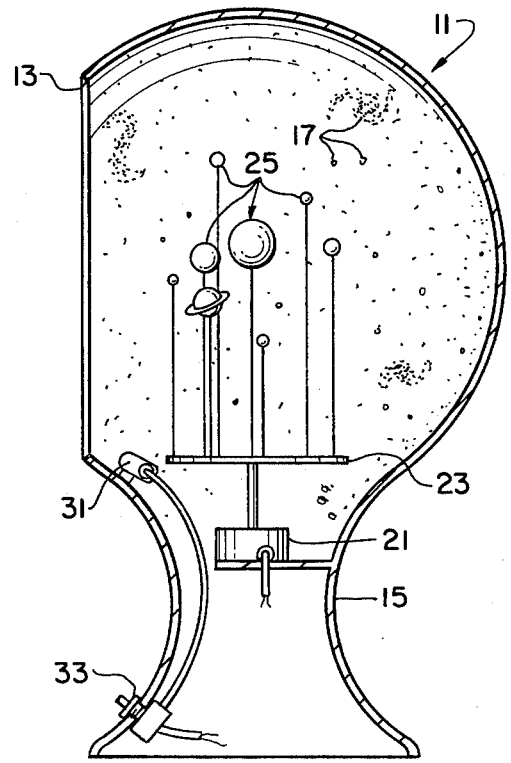
FIG. 2 shows cross-section through lines 2—2 of FIG. 1.

The first preferred embodiment is shown in FIGS. 1 and 2. This embodiment includes a spherical enclosure 11 with a viewing port 13 and a supporting base 15. The interior surface of sphere 11 is painted with a flat black paint (such as latex primer) and has representation 17 of galaxies and stars in non-toxic, water reduceable, phosphorescent paint that glows greenish-white in the dark painted over the flat black background. A motor 21 supports and rotates a frame 23 to which are attached representations 25 of the sun and planets. These representations 25 are painted with fluorescent poster colors and may be made of any convenient material such as styrofoam balls. An ultraviolet light source 31 is provided to illuminate the sun and planet representation 25 plus the stars and galaxy representations 17. An external off-on switch 33 for controlling ultraviolet source 31 is provided in the base 15.

Operation of the enclosed planetarium may now be explained. Initially ultraviolet light 31 is activated and electric motor 21 is activated to rotate the representations 25. The ultraviolet light from source 31 illuminates both the sun and planet representations 25 and the stars and galaxies representations 17 so that both are visible and the sun and planet representations 25 are rotating relative to the fixed stars and galaxies representations 17. Upon deactivation of ultraviolet source 31, the sun and planets representations 25 become invisible, but the stars and galaxies representations 17 continue to glow. The glow from representations 17 decays and after a few minutes becomes so feeble that activating ultraviolet source 31 to recharge the phosphorescent paint is necessary.

The use of ultraviolet light as the sole source of illumination together with phosphorescent and fluorescent paints provides an especially esthetic and pleasing effect which is unattainable by ordinary incandescent illumination. This effect is apparent in both the ultraviolet light on and ultraviolet light off modes.

As a variation, some of the stars and galaxies representations 17 may be painted with white enamel rather than phosphorescent paint and thus become invisible upon deactivation of the ultraviolet source 31. For example, a representation of the Milky Way could be done with white enamel and thus be visible only when the sun and planets are visible; in this case the phosphorescent painted stars and galaxies would represent deep space.

Figure 3:
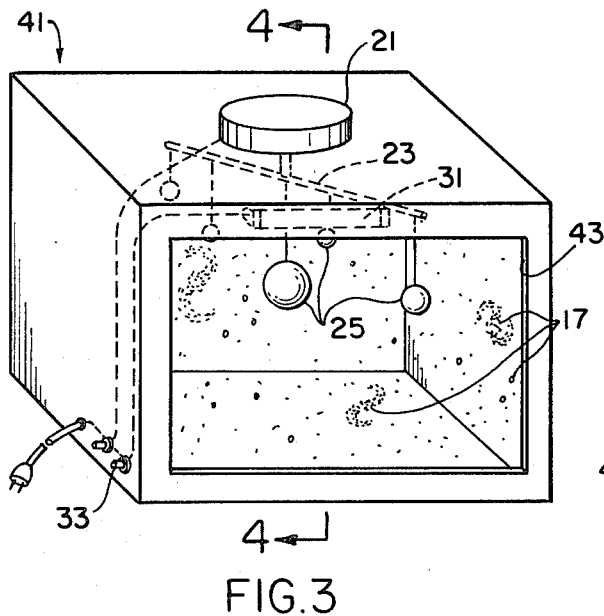
FIG. 3 shows a perspective view of the second preferred embodiment.
Figure 4:
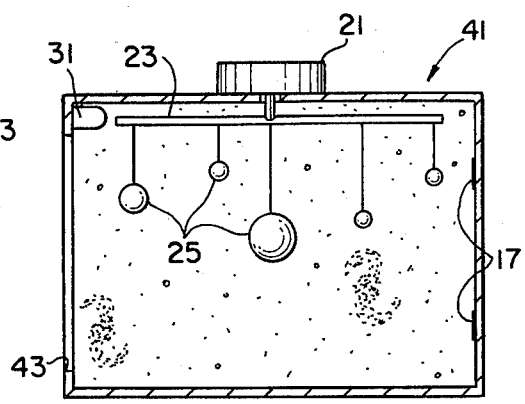
FIG. 4 shows a cross-section of the second preferred embodiment through section line 4—4 of FIG. 3.

A second preferred embodiment is shown in FIGS. 3 and 4. A box 41 has a viewing opening 43 and the interior face is painted in the same manner as the interior face of sphere 11; that is, flat black with representations 17 of stars and galaxies. Also analogous to the first embodiment in electric motor 21 is provided for rotating a frame 23 from which sun and planets representations 25 are suspended. The representations 25 are painted with fluorescent paint and the stars and galaxies representations 17 with phosphorescent paint. An ultraviolet light source 31 is provided for illuminating the representations 17 and 25 in the same manner as in the first embodiment.

Figure 5:
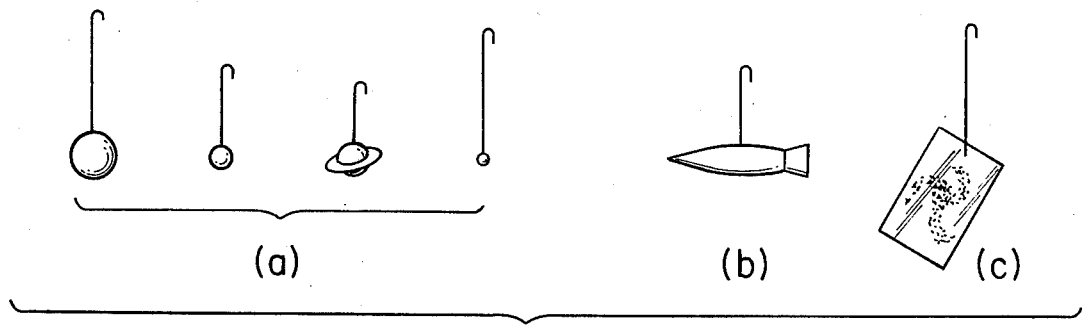
FIG. 5 shows alternative astronomical bodies which may be hung from the frame illustrated in FIGS. 3 and 4.

The astronomical representations 25 in the second preferred embodiment may be made easily and quickly removable by having them simply suspended from frame 23. FIG. 5 shows various representations that may be easily interchangeable and removable and for use with the second preferred embodiment. In particular, FIG. 5(a) shows representations of the sun and planets, FIG. 5(b) shows science fiction type space ships which could replace the sun and planets for a science fiction fantasy, and FIG. 5(c) shows deep space representations to substitute for the sun and planets.

Figure 6:
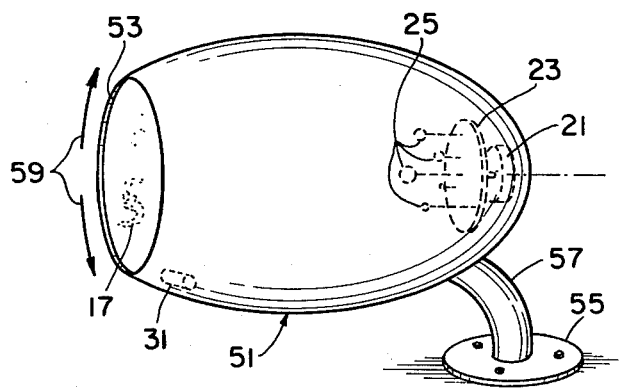
FIG. 6 shows a perspective view of the third preferred embodiment.

A third preferred embodiment is illustrated in FIG. 6. A motor 21 supports and rotates a frame 23 to which are attached representations 25 of the sun and planets. This is supported and contained in an open-ended egg-shaped enclosure 51, the open end 53 is the viewing port. Flexible support 57 attaches the enclosure 51 to base 55 which may be mounted in any convenient location such as on a table or wall. Flexible support 57 permits enclosure 51 to be tilted to various convenient viewing angles as is indicated by arrows 59. The interior of enclosure 51 contains stars and galaxy representations 17 and an ultraviolet light source 31, and operates in the same manner as the first two preferred embodiments with regard to illumination.

Figure 7:
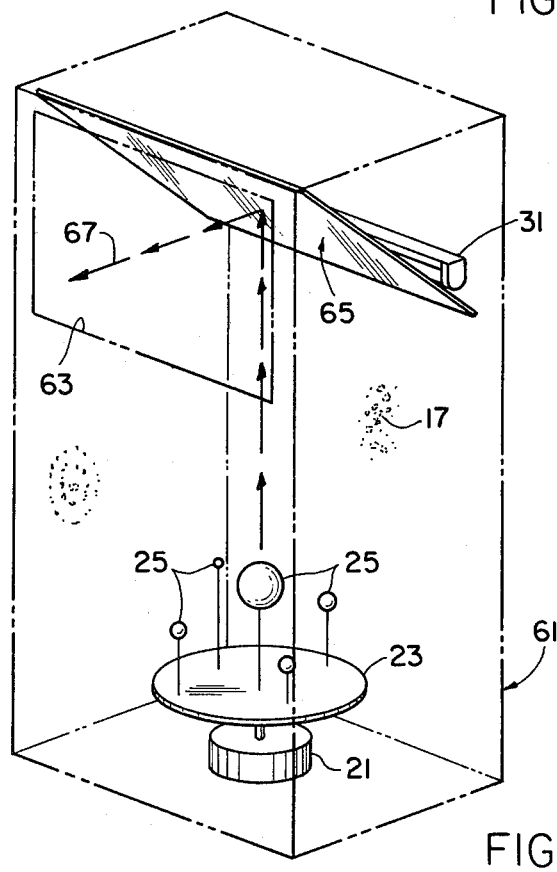
FIG. 7 shows a perspective view of the fourth preferred embodiment.

FIG. 7 shows a fourth preferred embodiment. A rectangular enclosure 61 again contains a motor 21 supporting and rotating a frame 23 to which are attached representation 25 of the sun and planets. Representations of the stars and galaxies are painted on the inside of enclosure 61, and ultraviolet light source 31 is provided to illuminate. In this fourth preferred embodiment, however, the representations are viewed through viewing port 63 after reflection in mirror 65; the path of light reflected from the representations is indicated by the line of arrows 67.

Figure 8:
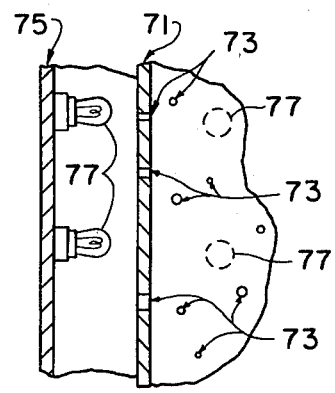
FIG. 8 shows a cross-section of additional outer wall and incandescent illumination which may be incorporated into any of the first four preferred embodiments.

FIG. 8 illustrates an additional mode of illumination which may be incorporated into each of the first four embodiments. For example, in terms of the second preferred embodiment, wall 71 of enclosure 41 is provided with small holes 73, to represent the stars or other galaxies, and an outer wall 75 upon which are mounted incandescent lights 77. In FIG. 8 the interior of enclosure 41 is to the right of wall 71. Thus in addition to the representations 17 and 25 in FIG. 4 the holes 73 provide a third set of representations which are illuminated by an independent source, namely the incandescent light 77 which shine through the holes 73 to create the representations. Thus a third display may be easily incorporated into the first four embodiments.

Figure 9:
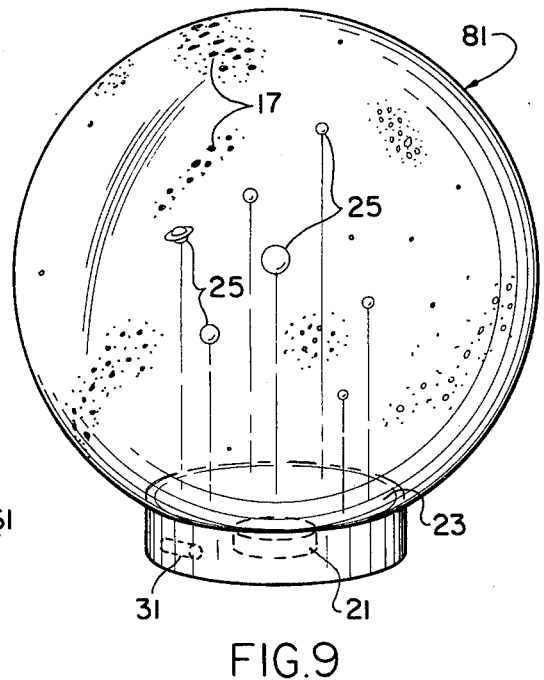
FIG. 9 shows a perspective view of the fifth preferred embodiment.

FIG. 9 illustrates a fifth preferred embodiment. A transparent enclosure 81 is provided with a motor 21 which supports and rotates a frame 23 to which are attached representations 25 of the sun and planets on the interior of the enclosure 81 representations 17 of the stars and galaxies are painted. An ultraviolet light source 31 is provided to illuminate representations 17 and 25 which, as with the first four embodiments, are painted with phosphorescent and fluorescent paints, respectively. The operation of the fifth preferred embodiment is analogous to that of the first four embodiments, with the distinction that the transparent enclosure 81 provides a different aura and ambience because the flat black paint which coats the interior of the first four embodiments is not used in the fifth preferred embodiment, rather enclosure 81 is to be transparent and thus viewable from any direction.

Each of the foregoing illustrative embodiments is easily adaptable to kit form. Indeed, each of the embodiments is conveniently packaged to be assembled and painted by a child with instructions which are both explanatory and informative as to the astronomical bodies represented. Especially instructive are the interchangeable representations described in connection with the second preferred embodiment because of the particular ease of interchangeability. Even after assembly and painting the embodiments may be used as educational aids in the learning of astronomy.

Although particular embodiments of the invention have been shown and described in full here, there is no intention to thereby limit the invention to the details of such embodiments. On the contrary, the intention is to cover all modifications, alternatives, embodiments, usages and equivalents of a solar system display as fall within the spirit and scope of the invention, specification and the appended claims.

I claim:
1. A miniature astronomical display comprising:
   (a) an enclosure, the interior of which is viewable from appropriate positions exterior to said enclosure,
   (b) a first set of representations of astronomical objects painted with phosphorescent paint and contained within said enclosure,
   (c) a second set of representations of astronomical objects painted with fluorescent paint and contained within said enclosure,
   (d) an ultraviolet light source positioned to illuminate said first and second sets,
   (e) means for activating and deactivating said ultraviolet light source,
   (f) said phosphorescent paint characterized by illumination of said first set by ultraviolet light causes said first set to glow and said glow decays but is still visible for a few minutes after said illumination terminates, and
   (g) said fluorescent paint characterized by illumination of said second set by ultraviolet light causes said second set to glow and said glow ceases just after said illumination terminates.

2. The display of claim 1, wherein said enclosure is essentially an opaque sphere with a opening for viewing.

3. The display of claim 1, wherein said enclosure is essentially an opaque oblong with an opening in one of the ends for viewing.

4. The display of claim 1, wherein said enclosure is essentially an opaque rectangular solid with an opening in one of the faces for viewing.

5. The display of claim 1, wherein said enclosure is essentially an opaque rectangular solid with an opening in the end region of one of the faces together with a mirror interiorly mounted near said opening for viewing.

6. The display of claim 1, wherein said enclosure is essentially a transparent sphere.

7. The display of claim 1, further comprising:
(a) a motor for rotation,
(b) a frame attached to said motor output,
(c) means for attaching at least a portion of said second set of representations to said frame, whereby activation of said motor results in the movement of said portion of said second set of representations.

8. The display of claim 1, wherein at least a portion of said second set of representations being easily insertable and removable from within said enclosure.

9. The display of claim 1, wherein said enclosure is provided with an outer wall, incandescent illumination sources between said enclosure and said outer wall, and with a plurality of small holes in said enclosure walls, whereby said incandescent illumination passing through said plurality of holes creates the illusion of representations of further astronomical objects within said enclosure.

* * * * *